Feb. 20, 1968  R. E. BROCHETTI  3,369,287

TUBE PULLER

Filed April 20, 1967  2 Sheets-Sheet 1

INVENTOR.
RAYMOND E. BROCHETTI
BY
Brown, Critchlow, Flick & Peckham
ATTORNEYS.

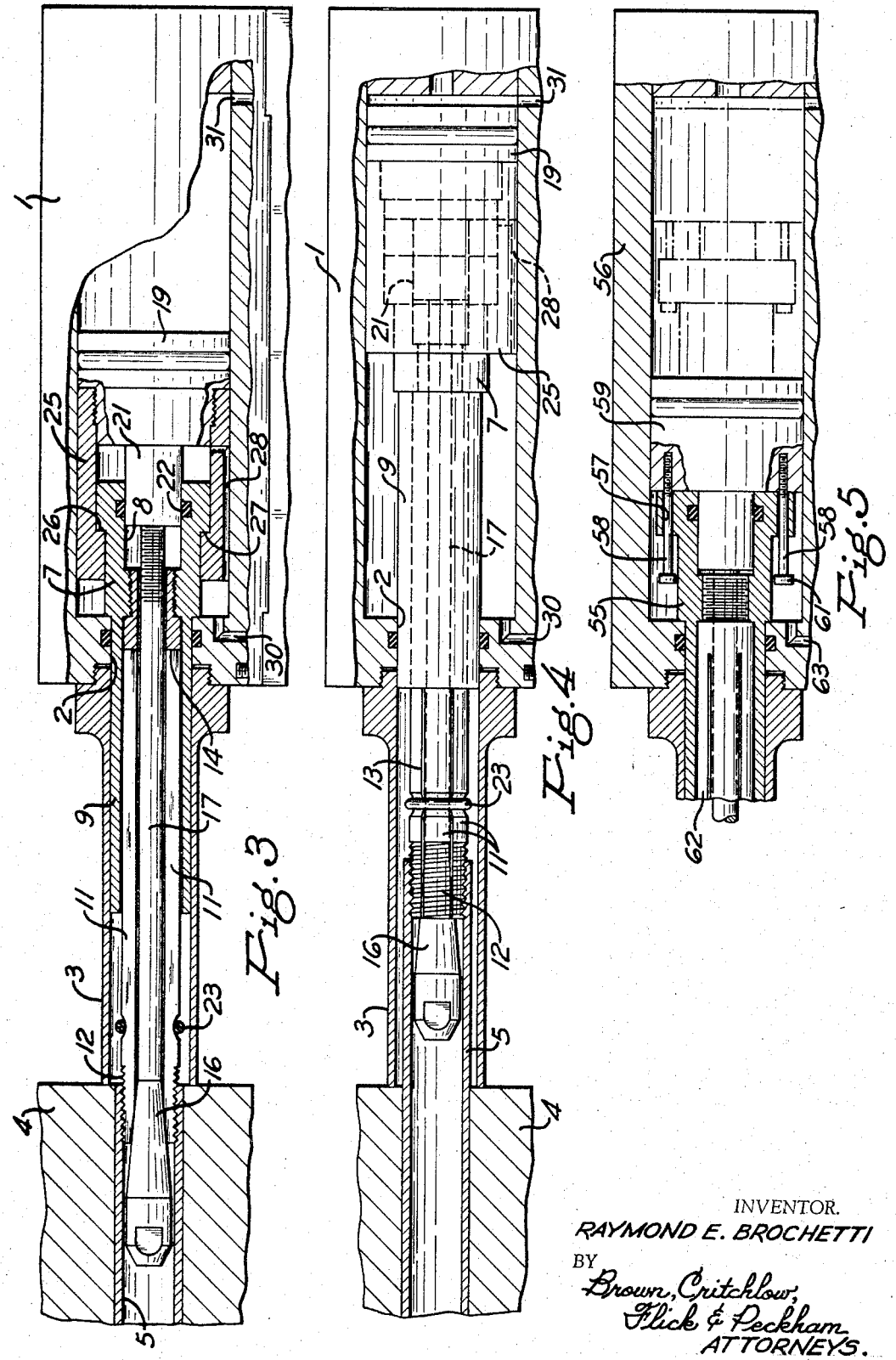

3,369,287
TUBE PULLER
Raymond E. Brochetti, Wilkinsburg, Pa.
(1212 Windermere Drive, Pittsburgh, Pa. 15218)
Filed Apr. 20, 1967, Ser. No. 632,257
5 Claims. (Cl. 29—252)

ABSTRACT OF THE DISCLOSURE

A fluid pressure cylinder contains two pistons. The front piston is connected to jaws that project from the front end of the cylinder, and the back piston is connected to a wedge for expanding the jaws when that piston moves rearwardly relative to the front piston. After the back piston has moved a certain distance, it pulls the front piston with it so that jaws and wedge are pulled in unison toward the cylinder.

*Background of the invention*

Figures 1, 2:
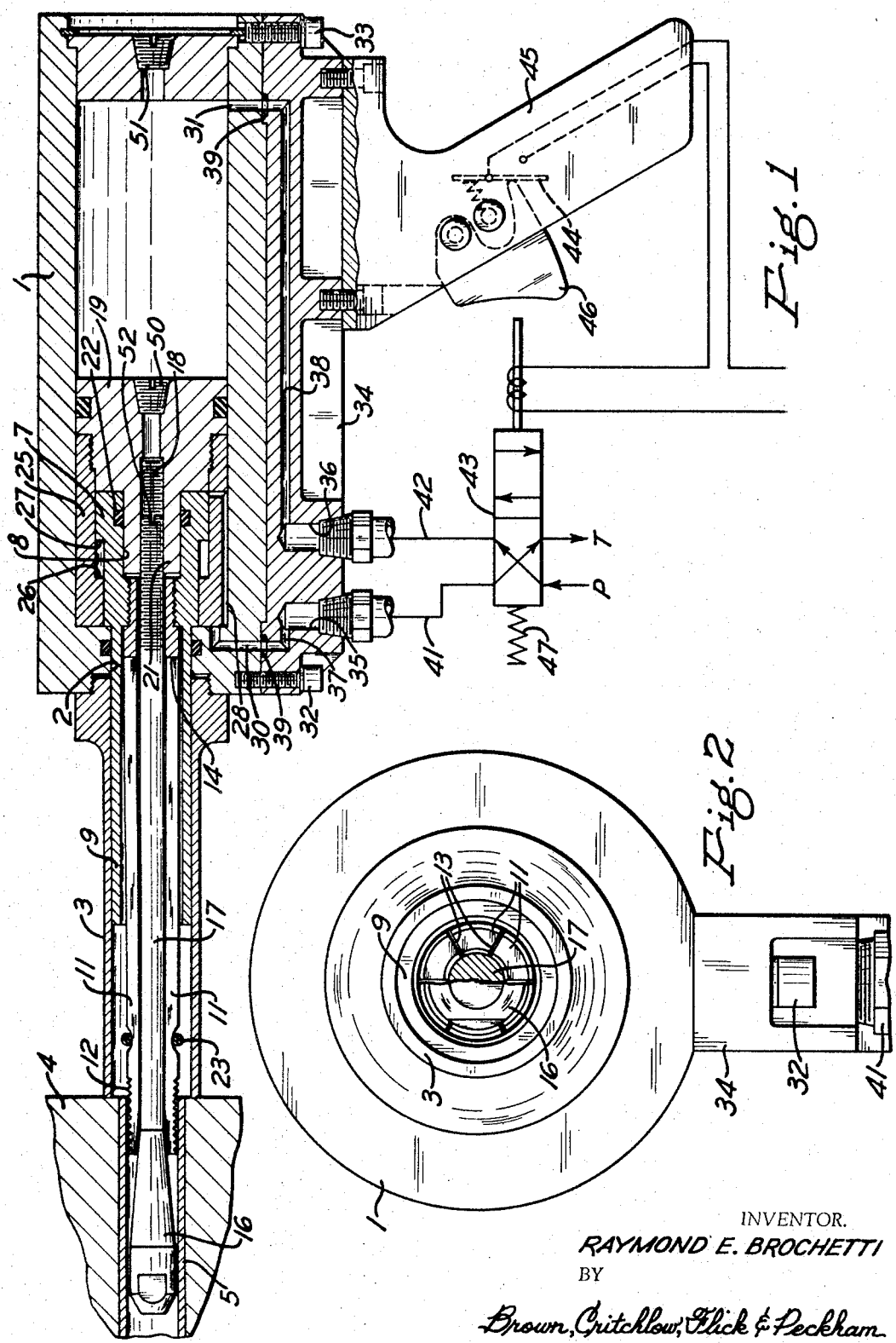

A common way to remove tubes from a tube sheet is to insert a tapered screw-threaded "spear" in a tube and then screw it into tight engagement with the tube by means of an impact wrench. The next step is to attach a fluid pressure operated device to the spear to pull it outwardly away from the tube sheet in order to pull the tube loose. The pulling device then has to be disconnected from the spear, the tube placed in a vise to prevent it from turning, and then the impact wrench applied to the spear again to unscrew it from the tube. All of this requires from two to three minutes, which adds up to a lot of time when hundreds of tubes are being pulled.

It is among the objects of this invention to provide a tube puller which is simple in construction and operation, which is very durable, which securely grips a tube to be pulled out of a tube sheet, which can pull and release tubes very rapidly, and which does not require the use of wrenches and vises.

In accordance with this invention, a fluid-pressure cylinder has a central opening in its front end, in which a tubular extension of a front piston in the cylinder is mounted. The piston has an axial passage through it. A rigid spacer is secured to the cylinder and projects in front of the extension for engaging a tube sheet. A plurality of spaced jaws in the extension are rigidly connected at their rear ends to the piston and project from the front end of the spacer. A rearwardly tapered wedge at the front ends of the jaws is connected by a rod extending between the jaws and through the front piston to a back piston disposed in the cylinder. Means are provided for supplying fluid under pressure between the pistons for moving them apart to cause the wedge to force the front end of the jaws apart. Secured to the back piston is means for pulling the front piston rearwardly after the back piston has moved backward a given distance, which will cause the wedge and expanded jaws to be pulled back in the spacer.

The invention is illustrated in the accompanying drawings, in which:

FIG. 1 is a longitudinal section of my tube puller;
FIG. 2 is an enlarged view of the front end, partly broken away;
FIG. 3 is a fragmentary side view and section, showing the tube puller after the jaws have been wedged in place;
FIG. 4 is a view similar to FIG. 3, but showing the jaws retracted; and
FIG. 5 is a fragmentary longitudinal section of a modification.

Referring to FIG. 1 of the drawings, a fluid pressure cylinder 1 is provided with a central opening 2 in its front end. Projecting from the front end of the cylinder is a rigid spacer 3 for spacing the cylinder from a tube sheet 4, from which a tube 5 is to be removed. Preferably, the spacer is a tube, the rear end of which is screwed into the front end of the cylinder around opening 2. Disposed inside the cylinder is a front piston 7 that has an axial passage 8 through it. Forward movement of the piston is limited by the front wall of the cylinder. This piston also has a tubular extension 9 that is slidingly mounted in the front opening of the cylinder. The extension extends out into the tubular spacer, and is long enough to remain in opening 2 when the piston is in its rearmost position.

Inside the extension and the spacer there is a plurality of long jaws 11 that normally project from the front end of the spacer. The outer faces of the projecting portions of the jaws are provided with teeth 12. The rear ends of the jaws are connected with piston 7. A feature of this invention is that that the jaws are an integral part of a tubular jaw member that is provided with radial slots 13 (FIG. 2) extending rearwardly from its front end to a point near the front piston. It is preferred to have about six of these slots to form six circumferentially-spaced jaws. The rear ends of the jaws join a tubular body 14 forming the rear end of the jaw member and screwed into the front end of passage 8 through the front piston.

In order to expand the jaws, a rearwardly tapered wedge 16 projects from their front ends. A rod 17, integral with or connected to the wedge, extends back through the jaw member and is adjustably threaded in an axial bore 18 in a back piston 19 slidingly mounted in the cylinder behind the front piston. Preferably, the back piston is provided with a forward projection 21 that fits in the axial passage of the front piston and is encircled by a sealing ring 22 mounted in the latter. When both of the pistons are in their normal forward positions in engagement with each other, rod 17 holds wedge 16 far enough forward to allow the jaws to be contracted by a rubber ring 23 or the like encircling them so that they can easily be inserted in tube 5.

Pulling means is secured to the back piston for pulling the front piston backward with it after the back piston has moved rearwardly a predetermined distance. This pulling means may take different forms, such as a sleeve 25 screwed onto the back piston and extending forward around the front piston. The front part of the sleeve and the rear part of the front piston have opposed radial shoulders 26 and 27 that face each other in spaced relation when the two pistons are in engagement with each other. The distance between these shoulders determines the distance that the back piston can move away from the front piston before the shoulders engage each other. The sleeve is provided with a passage 28 that extends from its front end back to the front end of the back piston, so that fluid entering the front end of the cylinder can flow back and into the space between the two pistons.

The cylinder is provided below opening 2 with a passage 30 that opens into its front end. At the rear end of the cylinder is another passage 31. Fastened to the bottom of the cylinder by screws 32 and 33 is a bar 34 that has a pair of ports 35 and 36 near its front end. One of these ports 35 is connected by a short passage 37 to front passage 30 of the cylinder, while the other port 36 is connected by a long passage 38 to the rear passage 31 of the cylinder. Where the bar passages register with the cylinder passages, there are sealing rings 39 set into the bar. The outer ends of the bar ports are connected by conduits 41 and 42 to a solenoid valve 43 which, in its normal position, connects the rear end of the cylinder with a source of fluid pressure and connects the front end of the cylinder with exhaust or a tank and, in the other position, reverses these connections. The solenoid is energized by closing an electric switch 44 inside a handle 45 fastened to bar 34. The switch is closed by a trigger 46 pivoted in the handle. When the trigger is released, a spring 47 reverses the valve.

In using this tool, fluid pressure is admitted to the rear end of the cylinder to move the wedge and the jaws to their most forward positions so that they can be inserted in tube 5 until the front end of spacer 3 engages the tube sheet, as shown in FIG. 1. Then the trigger is squeezed to reverse the valve and cause fluid under pressure to be delivered to the front end of the cylinder. This fluid will flow back through sleeve passage 28 and move the back piston backward in the cylinder as the front piston is pressed against the front end of the cylinder. This separation of the pistons will draw the wedge back between the jaws and thereby force their teeth radially outward into the inner surface of the tube to securely grip it, as shown in FIG. 3. As soon as shoulder 26 in the sleeve engages shoulder 27 on the front piston, the back piston cannot move backward any further relative to the front piston. Consequently, the fluid pressure in the front end of the cylinder then forces both pistons rearwardly in the cylinder together and this causes the jaws and the wedge to be pulled back in the spacer, with the result that the adjoining end of the tube is pulled out of the tube sheet a distance equal to the travel of the pistons, as shown in FIG. 4.

The trigger then is released so that the front end of the cylinder will be connected with the tank and the rear end of the cylinder will receive fluid under pressure to move the back piston forward against the front piston in order to push the wedge forward relative to the jaws. This will allow the jaws to contract so that they will be released from gripping engagement with the tube as the front end of the cylinder and the two pistons move toward each other to the relative positions shown in FIG. 1. All of this occurs nearly instantaneously when the trigger is released.

The normal, unexpanding position of the wedge relative to the jaws can be adjusted by turning the wedge to screw its supporting rod further into or out of the back piston. If the rod happens to break, it can be removed from the back piston by first removing plugs 50 and 51 from the rear wall of the cylinder and the back piston, and then inserting a long screw driver in a kerf 52 in the rear end of the rod to turn it.

It will be seen that this tube puller can be operated very rapidly to remove tubes in quick succession. In fact, it requires only a few seconds per tube. Due to the long length of the jaws, there is very little flexing where they join body 14, so there is a substantially straight line pull on the jaws that makes it extremely unlikely that they will ever break.

In the modification shown in FIG. 5, in which the pistons are shown in their normal front position in full lines and in their fully retracted positions in dotted lines, different means for pulling the front piston 55 backwardly in the cylinder 56 are used. Thus, the outwardly projecting portion of the front piston is provided with a number of circumferentially spaced bores 57 parallel to its axis. Slidably mounted in each of these bores is a rod 58, the rear end of which is screwed into the back piston 59. The front ends of the rods are provided with head 61. When the pistons are together in their front positions, the heads are spaced a predetermined distance in front of the bores. With the pistons in this position, the wedge and jaws 62 that are connected with the pistons are in their most forward positions, with the jaws contracted. When fluid under pressure is delivered through a passage 63 into the front end of the cylinder, it flows past the front piston and moves the back piston rearwardly in the cylinder, thereby pulling the wedge back in the jaw member to separate the jaws. When the heads on the rods strike the front piston, the latter will be pulled rearwardly by the back piston in order to pull a tube (not shown) out of a tube sheet. When the fluid pressure is reversed, the two pistons will be returned to the front end of the cylinder and the jaws will be released so that the tool can be removed from the tube.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A tube puller comprising a fluid pressure cylinder having a central opening in its front end, a front piston in the cylinder provided with an axial passage therethrough and with a tubular extension slidingly disposed in said opening, a tubular spacer secured to the cylinder and projecting in front of the extension for engaging a tube sheet, a plurality of spaced jaws in said extension rigidly connected at their rear ends to the front piston and projecting from the front end of said spacer, the jaws having exterior teeth at their front ends, a back piston slidingly mounted in said cylinder, a rearwardly tapered wedge at the front ends of the jaws, a rod extending lengthwise between the jaws and through the front piston and connecting the wedge with the back piston, means for supplying fluid under pressure between the pistons for moving the back piston rearwardly to cause the wedge to force the front ends of the jaws apart, and pulling means completely inside said cylinder secured to one of the pistons and engageable with the other piston for pulling the front piston rearwardly after the back piston has moved a predetermined distance, whereby to pull the wedge and spread jaws rearwardly relative to said spacer.

2. A tube puller according to claim 1, in which said jaws are circumferentially spaced around said rod and are integrally connected at their rear ends to a tubular body screwed into said piston passage, with said rod extending through said tubular body.

3. A tube puller according to claim 1, in which said front piston is spaced from the side wall of the cylinder, and said pulling means includes a sleeve slidingly mounted on the front piston and secured at its rear end to the back piston, the sleeve being provided at its front end with a rearwardly facing internal shoulder, and the front piston being provided with a forwardly facing shoulder normally spaced rearwardly from the sleeve shoulder but adapted to be engaged thereby when the back piston has moved said predetermined distance.

4. A tube puller according to claim 1, in which said fluid pressure supplying means includes a bar extending lengthwise of the outside of the cylinder, means for detachably fastening the bar to the cylinder, the bar being provided with fluid passages having inner ends registering with fluid passages in the side wall of the cylinder in front of and behind the pistons, the outer ends of the bar passages being adapted to be connected to fluid conduits controlled by a valve, a handle rigidly connected to the bar, an electric switch carried by the handle for operating the valve, and a trigger supported by the handle for actuating the switch, the fluid supplied to the cylinder passage behind the piston serving to move both pistons forward in the cylinder.

5. A tube puller according to claim 1, in which one of said pistons is provided with a plurality of circumferentially spaced bores therethrough parallel to its axis, and said pulling means are rods slidingly mounted in said bores, one end of each rod having a head to prevent the rod from leaving its bore, and the other end of each rod being rigidly mounted in the other piston.

References Cited

UNITED STATES PATENTS

| | | | |
|---|---|---|---|
| 1,717,487 | 6/1929 | Armstrong | 29—252 |
| 2,697,872 | 12/1954 | Armstrong | 29—252 |
| 2,950,525 | 8/1960 | Duncan et al. | 29—252 |
| 3,164,283 | 1/1965 | Olson | 29—252 X |

MYRON C. KRUSE, *Primary Examiner.*